United States Patent [19]

Otteson et al.

[11] 4,178,422

[45] * Dec. 11, 1979

[54] ETHYLSULFONATE-ALKYLAMINE COPOLYMERS AS COLORANT BACKBONES

[75] Inventors: Kenneth M. Otteson, San Carlos; Daniel J. Dawson, Los Altos, both of Calif.

[73] Assignee: Dynapol, Palo Alto, Calif.

[*] Notice: The portion of the term of this patent subsequent to Jan. 20, 1995, has been disclaimed.

[21] Appl. No.: 897,812

[22] Filed: Apr. 19, 1978

Related U.S. Application Data

[63] Continuation-in-part of Ser. No. 638,731, Dec. 8, 1975, Pat. No. 4,096,134.

[51] Int. Cl.$^2$ ................. C08F 28/00; C08G 75/00
[52] U.S. Cl. ................................. 525/336; 260/144
[58] Field of Search ...................... 526/23; 260/144

[56] References Cited

U.S. PATENT DOCUMENTS

| | | | |
|---|---|---|---|
| 3,304,297 | 2/1967 | Wegman et al. | 260/144 |
| 3,345,122 | 10/1967 | Meininger et al. | 260/144 |
| 3,405,116 | 10/1968 | Ischer | 260/144 |
| 3,553,286 | 1/1971 | Muratha et al. | 260/79.5 R |
| 3,637,581 | 1/1972 | Horiguchi et al. | 260/144 |
| 3,920,855 | 11/1975 | Dawson | 260/144 |
| 3,970,604 | 7/1976 | Wentworth | 260/79.5 R |
| 4,096,134 | 6/1978 | Otteson et al. | 526/23 |

FOREIGN PATENT DOCUMENTS 1283989  11/1968  Fed. Rep. of Germany ........... 260/144

OTHER PUBLICATIONS

Ida et al., *Yakugaku Zasshi*, 89(4), 517-530 (1969) (English language translation thereof).
English Summaries of Japanese Patents, SHO-41-14434/516917; SHO-41-14433/498390; SHO-42-5415/509166; SHO-43-3507/560594; SHO-43-5656/540064; SHO-43-15298/570318; SHO-43-26398/638890; SHO-44-6994/558266; SHO-44-6995/558267; SHO-44-8956/543184; SHO-44-13382/560593; SHO-44-18580/600952; SHO-45-27350/601106.

*Primary Examiner*—Ronald W. Griffin
*Attorney, Agent, or Firm*—William H. Benz

[57] ABSTRACT

Ethylsulfonate-alkylamine copolymers are disclosed. These copolymers find special application as intermediates in the preparation of new water-soluble polymeric colorants which are also disclosed, especially water-soluble polymeric colorants for edibles.

12 Claims, No Drawings

ETHYLSULFONATE-ALKYLAMINE COPOLYMERS AS COLORANT BACKBONES

This is a continuation-in-part of U.S. Ser. No. 638,731, filed on Dec. 8, 1975 and now issued on June 20, 1978 as U.S. Pat. No. 4,096,134.

BACKGROUND OF THE INVENTION

1. Field of the Invention

This invention relates to certain amine and sulfonate group-containing copolymers and their use as backbones upon which to build water-soluble polymeric colorants.

2. Prior Art

Polymeric colorants have been widely studied. Ida et al., *Yakugaku Zasshi*, 89 (4), 524–30 (1969), were among the first to add polymeric colorants to edibles and show that such colorants are not appreciably absorbed from the gastrointestinal tract into the systemic circulation following ingestion. Such a property potentially eliminates any systemic toxicity which might otherwise arise. Dawson et al., in U.S. Pat. No. 3,920,855, described additional polymeric colorants for edibles. The Ida et al materials were generally formed by joining together a plurality of polymerizable colorant groups into a macromolecule. The Dawson et al materials were formed from polymeric backbones to which were grafted colorant groups. The Dawson et al backbones generally carried amine groups. Gless et al, U.S. Pat. No. 4,018,826, disclosed polyvinylamine as a polymeric backbone for the affixment of colorant groups. The present invention concerns this type of colorant having a different backbone.

In many color-use systems, including the great majority of edible systems, it is essential that a polymeric color be water-soluble. If the colorant group itself is very water-soluble, such as those azo colorants which carry 1 to 4 sulfonate groups, very likely the resulting polymeric color will be soluble as well. However, many attractive colorant groups are not substantially soluble in water. With such groups, water solubility must be imparted by incorporating separate solubilizing groups into the polymer backbone. U.S. Ser. No. 638,730 filed Dec. 8, 1975, now U.S. Pat. No. 4,051,138, by Wang et al. discloses the solubilizing method wherein chromophores are attached to an amine-containing polymer and the polymer is then solubilized by sulfamating residual amine groups. Addition of the solubilizing group should add a minimum of weight and bulk to the colorant if maximum color strength is to be achieved. Likewise, other nonchromophore components, such as the backbone itself, should add minimum weight to the polymeric colorant.

The present invention concerns the use of vinyl sulfonate as a comonomer to impart water solubility to a polymeric colorant. Vinyl sulfonate,

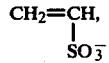

is commercially available as the sodium salt. Vinyl sulfonate has been used in the art with added comonomers to form structural copolymers and the like.

STATEMENT OF THE INVENTION

It has now been found that copolymers of vinylsulfonate and unsaturated lower alkylamines are excellent backbones for water-soluble polymeric colorants. Such copolymers offer the advantage of imparting a high degree of water solubility while contributing a minimum weight to the polymer.

DETAILED DESCRIPTION OF THE INVENTION

The Polymer Backbones

The polymer backbones of this invention are linear copolymers made up of repeating ethylsulfonate and alkylamine groups. The sulfonate component is represented by the formula

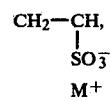

wherein $M^+$ is an alkali metal cation, especially $Na^+$, $K^+$, or $Li^+$. It is referred to herein as ethylsulfonate. The term "vinyl sulfonate" is used to refer to its precursor,

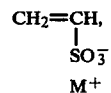

which is the commercially available material which is formed into the present copolymers.

The other component of the backbone is generally a single alkylamine group. Of course, a plurality of amines could be used within the purview of this invention, but for simplicity, a single amine is generally preferred. The alkylamines are lower alkylamines, that is amines having from 2 to about 6 carbons per amine group. They should be olefinically saturated when present in the copolymer. The amine groups are joined into the backbone through carbon-carbon single bonds, not through amine links.

Suitable amines in their combined forms include ethylamine, N-methylethylamine, α-methylethylamine, 3-methylpiperidine, β-methylethylamine, butylamine and the like. These suitable amines can be represented structurally by the formula:

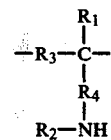

wherein each of $R_1$ and $R_2$ are independently selected from the group consisting of hydrogen and lower saturated alkyls of up to 4 carbon atoms, $R_3$ is a branched or linear lower saturated alkyl of from 1 to 4 carbon atoms, and $R_4$ is a carbon-nitrogen single bond or a 1 to 4 carbon alkyl subject to the limitation that the total number of carbon atoms in $R_1$, $R_2$, $R_3$, and $R_4$ is not greater than 5. $R_2$ and $R_3$ can be joined into a single lower alkyl such as occurs with 3-methylpiperidine.

The copolymer backbone is represented by the structural formula:

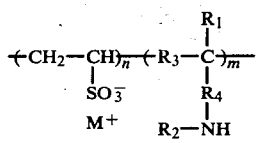

wherein n and m are integers greater than 1. Preferred amines are ethylamine, N-methylethylamine and 3-methylpiperidine. For use in the manufacture of polymeric colorants, the sum of n plus m generally is substantially greater than 1, such as from about 20 to about 8000, preferably n+m is from about 60 to about 6000 and more preferably from about 100 to about 3000. It will be appreciated that any value for n, m or n+m will be an average value and that the actual exact size of any single molecular chain will not be precisely known.

The proportions of amines and sulfonates may be varied. A 1:1 copolymer (i.e., n=m) may be prepared or n can equal from about 0.4 to 2.5 times m. When good water solubility of a colorant is of maximum importance, n generally should be not less than about 0.5 m (i.e., from 0.5 to 2.5 m). Most preferably n is equal to 0.6 to 1.5 m.

PREPARATION OF THE BACKBONES

The backbones are prepared by copolymerizing a mixture of vinyl sulfonate and an olefinically unsaturated alkylamine or, more commonly, an olefinically unsaturated alkylamine precursor such as an amide. This copolymerization is carried out in liquid phase in the presence of a free radical initiator. Typical useful conditions for polymerization are a temperature of from about 40° C. to about 100° C., a reaction time of from 2 to 100 hours, from about 0.5 to 5%, basis monomer, of a free radical initiating catalyst such as benzoyl peroxide, AIBN or the like, and an aqueous/organic liquid reaction medium such as a lower alkanol with water. Such conditions are typical. Other conditions, known to the art as suitable for free radical polymerization, may be employed as well. Representative preparations are illustrated in detail in the present Examples.

COLORANTS BASED ON THE COPOLYMERS

The ethylsulfonate/akylamine copolymers find good application as backbones for polymeric colorants. In such use, color bodies, herein referred to as "chromophores" or "chromophoric groups", are covalently affixed to the copolymer backbones through the copolymer's amine nitrogens.

THE CHROMOPHORIC GROUPS

The chromophoric groups employed in these coloring compositions are organic optical chromophores. These materials are defined to be organic chemical groups which exhibit a visual color to the human eye when attached to a polymeric backbone via amine linkages. These chromophores can be selected from a wide range of classes of groups, including the azo chromophores, anthraguinone chromophores, xanthene chromophores, triphenylmethane chromophores, indigoid chromophores, and the like. These classes of chromophores are merely represenative—other similar materials also being usable. Among these chromophores special preferences are given to azo chromophores because of the great variety of technically important clear intense red to yellow colors which they provide and to anthraquinone chromophores because of their great stability under stressful conditions of heat and light and the wide range of colors which they permit. Among chromophores, those which are themselves water-insoluble generally achieve most improved usefulness when used in the present polymeric form. A chromophore is defined as being water-insoluble if its solubility in room temperature water at neutral conditions (pH 7) is less than 500 parts per million weight (basis water). Conversely, a polymeric colorant made in accordance with this invention is water-soluble, which property is defined to mean that such a polymeric color exhibits a solubility in neutral room temperature water of greater than 500 parts per million weight (basis water).

Preferred anthraquinone chromophores in their unattached (monomeric) state have a leaving group such as a —CL, —Br, —I, —SO$_3$Na, —N$_2^{\oplus}$Cl$^{\ominus}$, or —NO$_2$ group attached to their aromatic ring. This permits the chromophore's facile attachment to the backbone amines by the known technique wherein copper is used to catalyze the leaving groups' displacement by amines. In many cases, no catalyst is required to effect the desired displacement. Representative classes of useful anthraquinone chromophores include:

Aminoanthraquinone chromophores of the structure of Formula I;

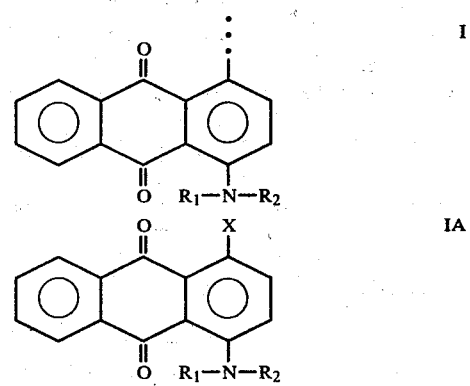

formed by coupling the monomer IA wherein R$_1$ is a hydrogen or a lower saturated alkyl of up to four carbon atoms, R$_2$ is hydrogen, a lower saturated alkyl of up to four carbon atoms or an aryl or alkaryl of from six to eight carbons and X is a leaving group. These are useful to give the range of blue colorants listed in Table I.

TABLE I

| Compound | | |
|---|---|---|
| R$_1$ | R$_2$ | Color |
| hydrogen | hydrogen | purplish blue |
| hydrogen | methyl | greenish blue |
| hydrogen | ethyl, propyl or butyl | greenish blue |
| hydrogen | aryl | navy blue |

Anthrapyridones of the structure of Formula II;

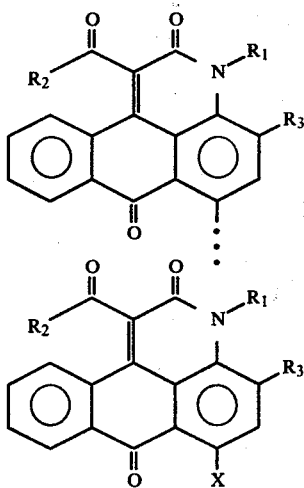

formed by coupling the corresponding monomer, wherein X is a leaving group, $R_1$ is hydrogen, a lower saturated alkyl of from 1 to 4 carbon atoms inclusive, or an aryl grouping of about 6 carbons, $R_2$ is a 1 to 4 carbon lower saturated alkyl, a 1 to 4 carbon lower saturated alkoxy, or an aryl grouping of about 6 carbon atoms, and $R_3$ is hydrogen or a 1 to 4 carbon lower saturated alkyl. These chromophores are rich reds. Preferred among the anthrapyridones are these according to Formula II wherein $R_1$, $R_2$, and $R_3$ are as shown in Table II.

TABLE II

| $R_1$ | $R_2$ | $R_3$ |
|---|---|---|
| hydrogen | 1–4 carbon alkyl | 1–4 carbon alkyl |
| hydrogen | methyl | methyl |
| hydrogen | methoxy | 1–4 carbon alkyl |
| hydrogen | methoxy | methyl |
| hydrogen | ethoxy | 1–4 carbon alkyl |
| hydrogen | ethoxy | methyl |
| hydrogen | phenyl | methyl |
| methyl | methyl | hydrogen |
| methyl | phenyl | hydrogen |
| ethyl | methyl | hydrogen |
| methyl | methoxy | hydrogen |
| ethyl | methoxy | hydrogen |

Anthrapyridines of the structure of Formula III:

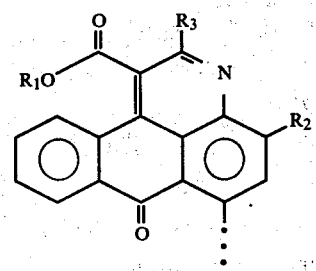

which are formed by coupling the corresponding monomeric chromophore

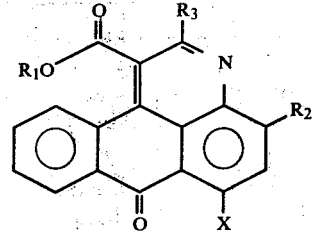

wherein X is a leaving group, $R_1$ is a 1 to 4 carbon lower alkyl group or an aryl group of about 6 carbons and $R_2$ is hydrogen or a 1 to 4 carbon lower alkyl and $R_3$ is a 1 to 4 carbon alkyl group or aryl group of about 6 carbons. These colorants range in hue from yellow to red. Preferably $R_2$ is hydrogen or methyl. Other typical anthraquinone chromophores include the pyridinoanthrones, anthrapyrimidines and anthrapyrimidones.

Among the azo chromophores, those having monomeric forms containing sulfonyl halide groups comprise one preferred class since they can join to the amine backbone via the well-known Schotten-Baumann reaction. Exemplary azo chromophores and representative halo precursors include:

| Chromophore | Precursor |
|---|---|
| (Orange) | |
| (Burgundy) | |

The Schotten-Baumann reaction also functions with sulfonyl halide-containing nonazo chromophores such as:

| Chromophore | Precursor |
|---|---|
| 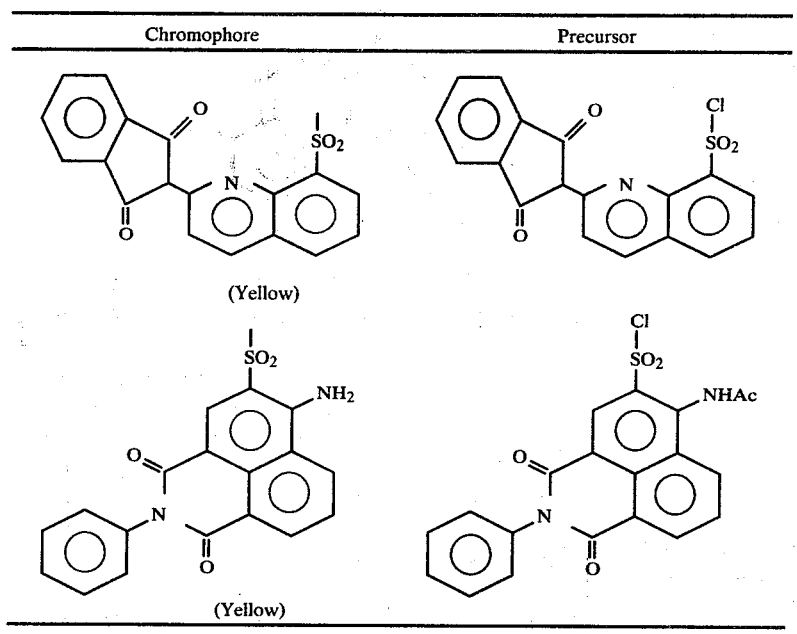 | |
| (Yellow) | |
| (Yellow) | |

The attachment of these or other chromophores may be carried out by any of the methods for joining a chromophore to a polymer through an amine link known in the art. In the case of anthraquinone chromophores, it is possible to achieve facile attachment by employing an anthraquinone bearing a leaving group attached to its aromatic ring. This leaving group is readily displaced by the backbone amine, generally in the presence of a copper catalyst, such as copper metal, cuprous oxide, copper I salts (cuprous chloride, etc.), copper II salts (cupric acetate, etc.), and complexes of copper, copper oxides and/or copper salts optionally with an inert carrier such as a carbon carrier. This reaction is generally carried out at an elevated temperature, such as from about 60° C. to about 130° C., with the solvent reflux temperature often being most convenient. Following reaction, it is best to filter the reaction mixture to remove solid catalyst which could interfere in later steps.

In another representative attachment method, an alkyl halide group-containing chromophore is contacted with the amine backbone under alkylation conditions. Preferred alkyl halide groups include methyl chloride and methyl bromide groups. In general, no catalyst is required and a mixed aqueous/organic (e.g., aqueous/THF) solvent is employed. With this reaction, it is important to block any amine groups on the chromophore, such as by acetylation, prior to attachment and after attachment unblock them.

In the Schotten-Baumann reaction coupling method a chromophore bearing a sulfonyl halide group is reacted with the amine backbone in the presence of base at pH 10–11 to form the desired covalent bond. This reaction goes smoothly at temperatures of from 0° to 60° C. and requires from about 2 to 12 hours to complete. In the case of azo compounds, it should be remembered that the polymer backbone with its amine groups could interfere with an attempt to diazotize an attached azo dye precursor. Thus, it is best when azo colors are involved, to attach a diazotized color unit, rather than an undiazotized azo color precursor.

These three routes to color attachment are merely representative. Other methods may be used if desired.

The portion of amine groups which are used to attach chromophores can vary. In general, it is desirable to have as many as possible react so as to impart the greatest possible tinctorial strength to the polymeric colorant. Often, however, it is not possible to achieve quantitative substitution of the amine groups. Substitution of from about 30% to 100% of the amine groups with chromophores is highly desirable to achieve a truly useful polymeric colorant. Under normal conditions, substitutions of from about 30 to about 70% can be achieved.

USE OF COLORANTS

The colorants of this invention, being water-soluble find wide application for example in the fugitive coloring of textiles and in the coloring or tinting of water-solvented or water-containing materials such as water-based paints and inks, hydrophillic polymers, and the like. In an especially advantageous use, these colorants are admixed with edible materials, such as foods, beverages, medicines and the like. In this use it is most useful to size the colorants such that their molecular weight is not less than about 1500, preferably from 2000 to 200,000 most preferably from 5,000 to 150,000. A colorant of this molecular weight has a molecular size which is too large to permit its absorption through the walls of the gastrointestinal tract and thus any risk of systemic toxicity arising from absorption of colorant from the gastrointestinal tract is essentially eliminated. The colorants, because of their carbon-carbon backbones and direct amine-linked chromophores, are essentially free of degradation at the conditions of passage through the gastrointestinal tract.

In nonedible applications, the colors of this invention may be used alone or may be admixed with other colorants in amounts of from about 20 ppm to 10% by weight in water-based paints, in water-soluble inks and dyes and may be applied to fibers, fabrics, paper and the like.

In applications with edible materials, the colorants are added in an effective coloring amount, say from about 10 ppm to about 1% by weight (preferably from 10 ppm to 1000 ppm) to foods such as gelatin desserts, dispersed in dry cake mixes and cereals, added to fruits and other canned foods, to beverages such as carbonated beverages, for example orange, grape and cherry soda, wines and the like; and added to medicines such as cough elixers, cough drops and diverse other usually colored medicaments for man or beast alike. These applications involve the art known procedures of dispersing, dissolving or otherwise spreading the colorant upon or through the object to be colored.

The invention will be further described by reference to the following examples. These are intended to provide an understanding of specific embodiments of the invention and are not to be construed as limiting the invention's scope.

EXAMPLE I

This Example sets forth a preparation of an ethylsulfonate ethylamine copolymer and its use in a water-soluble colorant.

A. Preparation of Vinylacetamide

To 2304 g of acetamide (technical) in a 12 liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C. and a mixture of 150 g calcium carbonate (precipitated chalk) and 150 g of Celite$^R$ diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide and 306 g of acetamide. A portion of this pooled material is dissolved in isopropanol, cooled, and filtered to yield a stock solution. This stock solution is analyzed and found to be 4.1 Molar in vinylacetamide.

B. Preparation of Copolymer

Into a five liter flask is added 280 ml (272 g) of a vinylacetamide solution obtained by stripping isopropanol from 500 ml of the stock solution of Part A (containing 176 g of vinyl acetamide). AIBN (6.6 g) in 100 ml of methanol is added followed by 1046 g of 25% w.sodium vinyl sulfonate in water (Research Organic Corp.) and a liter of water. This is one equivalent of sulfonate per equivalent of vinylacetamide. Following deoxygenation, the mixture is heated to 65° C. and there maintained with stirring for 57 hours. This reaction mixture is then reduced to ⅔ volume and added to seven liters of acetone. The copolymer precipitate is collected and dried in vacuum to yield 536 g of solid copolymer (MW $2.1 \times 10^4$). Whenever an experimental molecular weight is given herein, it is derived by gel permeation techniques. In the primary technique, a silanized porous glass support is used with a 0.01 M LiBr in DMF eluent. Detection is by refractometer with standardization being based on suitable purchased poly(styrene) or poly(styrenesulfonate) standards.

Into a two liter flask is added 400 g of the just-noted solid product, 600 ml of water and 400 ml of concentrated hydrochloric acid. The mixture is refluxed (99°-110° C.) for about 50 hours. Brine (600 ml) and 60 ml of additional concentrated hydrochloric acid are added during the reaction to maintain solubility. The reaction mixture is added hot to about twelve liters of methanol to give a fine solid precipitate which after drying totals 218 g. This product is examined by elemental analysis and NMR and determined to be a $1:1\pm5\%$ copolymer of sodium ethylsulfonate and ethylamine.

C. Attaching Chromophore to Copolymer

To 95 ml of water is added four grams of Na$_2$CO$_3$ and 2.5 grams of the copolymer of Part B. When this has dissolved, five ml of pyridine is added followed by nine grams of the anthrapyridone chromophore,

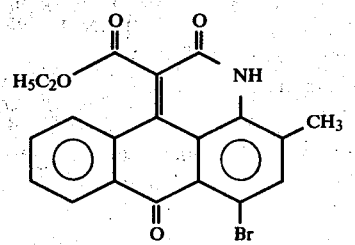

purchased from Sandoz Color and Chemical Co. The temperature is brought to 95° C. Cuprous oxide (2.5 g) catalyst is added. The mixture is maintained at temperature for 4¼ hours. Na$_2$CO$_3$ is added during heating to maintain the pH at 10.7–10.8. The reaction mixture is filtered, brought to pH 9 by HCl addition, combined with twelve ml of pyridine, passed through a Sephadex column, reduced to 110 ml, passed through a Sephadex column again to remove unattached chromophore, stripped of solvent to dryness, dissolved in 40 mls of water at pH 7, passed through a Sephadex column again, and freeze dried to give about 1.5 g of a polymeric colorant having the following structural units.

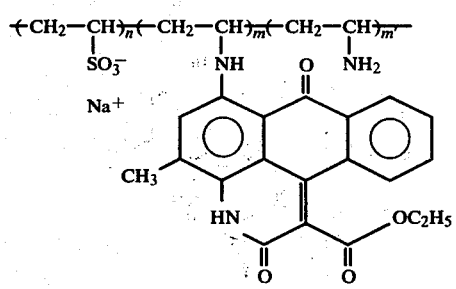

This product has a red color. This product has a peak molecular weight of about $4 \times 10^4$. Proton and reductive titrations are carried out on the product. These analyses indicate that n equals about 110, m equals about 60, and m' equals about 70.

D. Use of Polymeric Colorant

The product of Part C could function as a colorant for edibles or other substrates. It is water-soluble so it might be dissolved in soft drinks, in gelatin desserts, in cough tonics or in cake batter. It might also be dry-mixed as a powder in soft drink powders or cake mixes.

EXAMPLE II

The colorant preparation of Step C of Example I is repeated with modifications. Instead of the purchased anthrapyridone chromophore employed in Example I, an equimolar amount of

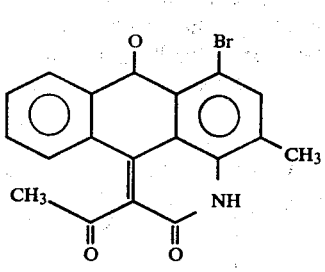

chromophore is employed. This chromophore is prepared in a number of batches which are pooled. A representative preparation is as follows:

Into a two liter flask is placed 100 g (422 mmol) of 1-amino-2-methylanthraquinone (BASF) and 500 ml of glacial acetic acid. The mixture is heated to 42° C. and 135 g (844 mmol) of bromine is added over about 20 minutes. After stirring for 1½ hours at 42°-56° C., the reaction mixture is filtered. The solid product is washed with acetic acid (500 ml) and water (1000 ml). The wet filter cake is added to a liter of 0.5 N $NaHSO_3$ and stirred for 90 minutes with warming. The red solid 1-amino-2-methyl-4-bromoanthraquinone is recovered, washed and dried.

A 100 ml flask is charged with 12.6 g (40 mmol) of the 1-amino-2-methyl-4-bromoanthraquinone, 11.4 g of ethylacetoacetate, 20.3 g of nitrobenzene and 0.33 g of sodium acetate. The mixture is heated to 150° C. in a 175° C. oil bath with stirring. Lower boiling materials (water, ethanol, etc.) are distilled off as they are produced. After heating for four hours, the reaction mixture is cooled and filtered. The residue is washed with methanol, water and methanol and is found to be 3'-acetyl-2-methyl-4-bromo-1,9-anthrapyridone, i.e.,

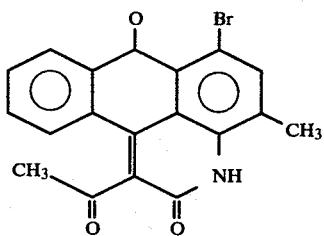

This material is coupled to the polymer backbone as follows: To 200 mls of water are added 5.0 g of the sodium ethylsulfonate-ethylamine copolymer of Part B of Example I, 1.17 g of NaOH, 12 g of chromophore, and 1.5 g of $Cu_2Cl_2$. The mixture is refluxed for 7½ hours. Periodically, base is added to hold the pH at 12.5-12.8. At 5½ hours, four grams of chromophore are added. At seven hours, 1.5 grams of $Cu_2Cl_2$ and two grams of chromophore are added. The reaction mixture is filtered (with added Celite ® diatomaceous earth filter aid) to remove solids. The polymeric colorant is precipitated by adding methanol and ethylacetate and collected. It is redissolved in water, dialyzed and freeze-dried to yield a final solid product. This product is titrated to determine the extent of chromophore attachment. About 45% of the amine groups have joined to chromophore groups.

EXAMPLE III

This Example sets forth a preparation of 3-methyl-piperidine-ethylsulfonate copolymer and its use in the production of a polymeric colorant.

A. Preparation of Polymer Backbone

Into a 50 ml flask is added 6.2 g of diallylamine hydrochloride and 20 ml of a 25% aqueous solution of sodium ethylenesulfonate (Research Organics). t-Butylhydroperoxide polymerization catalyst (0.2 ml) is added and the mixture is brought to 50°-55° C. with stirring. At 18 and 24 hours 0.2 mls of additional catalyst is added. At 41 hours the reaction heat is turned off. The reaction mixture is diluted with 25 ml of water, filtered and then poured into methanol. A white precipitate forms which is dried in vacuum. Gel permeation chromatography indicates a peak molecular weight of $6.6 \times 10^3$ for the product. Titration of amine groups indicates that 48 amine groups are present for each 52 sulfonate groups.

B. Attachment of Chromophores

The known [R. R. Pritchard et al, J. Chem. Soc., (1938) page 2047] benzanthrone sulfonyl chloride:

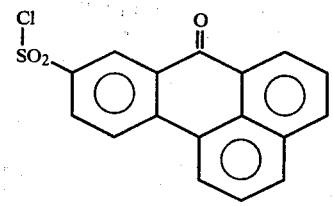

(2.91 g) is stirred in 25 ml of ethylene glycol. This mixture is then combined with four ml of water plus two ml of ethylene glycol and 2.0 g of the polymer of Part A. Additional glycol (35 ml) is added and the mixture is brought to 90° C. NaOH is added to maintain the pH at 9.8-10.0. After 45 minutes the reaction mixture is cooled, added to 100 ml of water, filtered, dialyzed against pH 8 water, and freeze-dried. Analysis indicates that about ½ of the amine groups have reacted with the chromophore to yield

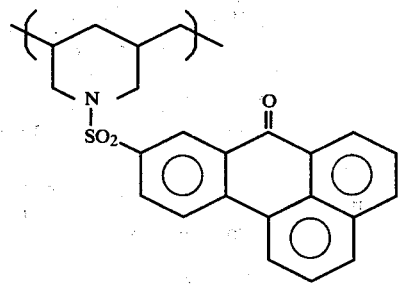

groups. This is a polymeric yellow colorant. It could be added to edibles such as beverages, pharmaceuticals, and the like.

EXAMPLE IV

This Example sets forth the preparation of an N-methylethylamine-ethylsulfonate copolymer and its use in the preparation of a polymeric colorant.

A. Preparation of Copolymer

N-methylacetamidoethylene (3.81 g) is added to 20 g of a 25% w solution of sodium ethylene sulfonate in water. 0.32 g of AIBN is added, the mixture is deoxygenated and heated to 80° C. An exotherm carries the temperature to about 95° C. The mixture is stirred for about five minutes and then added to isopropanol in which a pale pink-white fluff forms. This fluff is recovered, washed with isopropanol, dried and determined to have a peak molecular weight of $4 \times 10^4$.

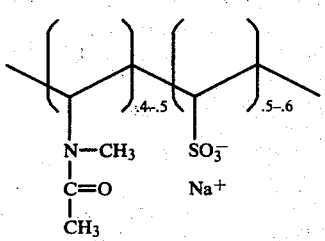

This copolymer (6.35 g) is placed in 720 ml of 6 N hydrochloric acid and stirred at 125° C. for 68 hours. The reaction mixture is cooled, brought to pH 3 with 2.5 N sodium hydroxide, stripped to 40 ml, filtered to remove solids, and then further stripped to yield a copious precipitate in about 20 ml of solution. Nine ml of water is added to redissolve the solid and the solution is added to 600 ml of methanol in which an off-white solid forms, if collected, washed and dried. NMR analysis shows that the acetamide groups have essentially all been coverted to amine groups such that the final copolymer has the structure

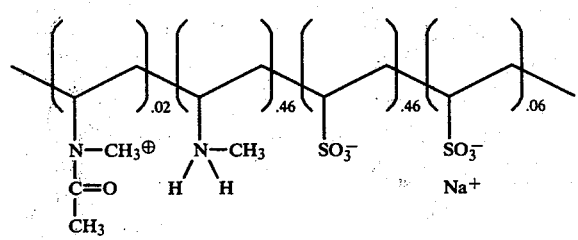

B. Preparation of Chromophore 4.4 g (10 mmol) of D&C Orange #4 (Eastman):

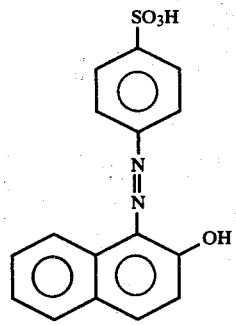

is reacted overnight at room temperature with an excess of acetic anhydride in pyridine to acetylate the naphthyl hydroxyl group. The acetylated product is recovered and added to a solution of an excess of $SOCl_2$ in DMF. After stirring for two hours at room temperature, the bright orange sulfonyl chloride derivative

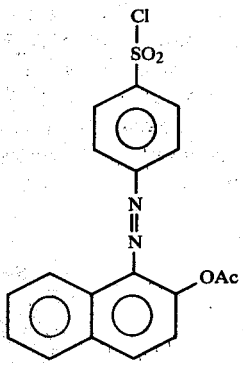

is recovered.

C. Coupling of Chromophore to Backbone

The backbone of Part A of this Example (1.86 g, 4.6 meq of available amine) is dissolved in a 2:1 mixture of water and THF. Base is added to pH 10. Next, 0.71 g (0.4 equivalents based on available amine present) of the chromophore of Part A is slowly added at room temperature while maintaining the pH at 9.0-9.5 by NaOH addition. Additional THF and NaOH are added, the pH is raised to 11.0, and finally the THF is stripped to yield the product:

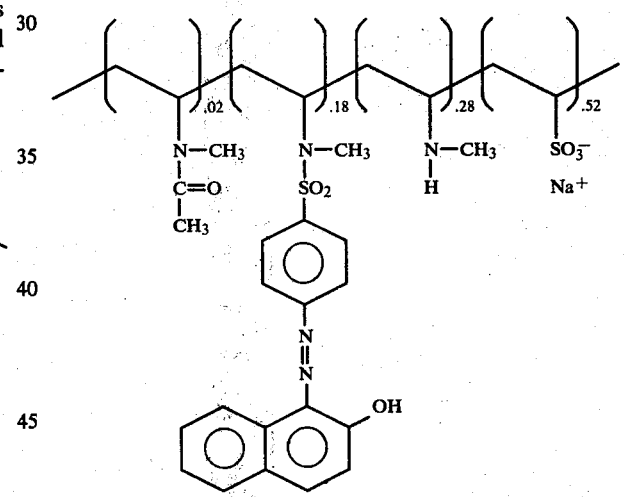

(peak molecular weight about $5 \times 10^4$) as a precipitate which is collected.

EXAMPLE V

A. Monomer Preparation

A three-liter stripper flask is set up, equipped with an agitator, mantle, thermocouple, feed port, argon bleed and stripping-distillation system. Also a glass column is charged with a kilogram of Amberlite®IR-120 plus ion-exchange resin. The resin is activated by contact with 10% w $H_2SO_4$ and then rinsed.

A reaction flask is charged with 1.42 kg of acetamide dissolved in 1.8 l of deionized water. Then 440 g of acetaldehyde is added. This mixture is fed to the top of the column at the rate of 50-150 ml/minute. The column eluent is tested for organics. When organics begin to appear, the eluent is passed to the stripper flask where at 40-75 mm Hg absolute pressure water and acetamide are stripped overhead.

When water and acetamide are removed (temp equals 175° C.-180° C.), Celite ® 503 diatomaceous earth (100 g) and calcium carbonate are added to the stripper flask. A 40-75 mm vacuum is applied and the temperature is raised to 200° C.±5. This causes the ethylidene-bis acetamide formed in the contact with the ion exchange resin to crack and give acetamidoethylene which is taken overhead and collected.

B. Copolymer Preparation

Acetamidoethylene monomer prepared in Part A (5 moles) is added to a 5 liter agitated reactor along with 2.7 moles of vinylsulfonate (sodium salt) and 16 g of AIBN. The materials are placed in a 5 liter reaction flask and heated to 75° C. while d oxygenating the flask. Temperature is increased to 80° C. and held there for 180 minutes. The reaction mixture, a solution of a copolymer of vinylacetamide and vinylsulfonate, is dissolved in water. This solution is purified by filtration and ultrafiltration in an Amicon ultrafiltration unit in the presence of added NaCl. Low molecular weight impurities are removed leaving a solution of vinylacetamide-vinylsulfonate as retentate.

C. Copolymer Hydrolysis

A Teflon-lined reaction vessel is charged with 4-7 kg of 30% copolymer solution of Part B. The 50% NaOH (1-1.5 kg) is added and the reaction is taken to 90°-95° C. and then 125° C. and there held for 22 hours. The sodium ethylsulfonate-vinylamine copolymer product is then collected.

D. Colorant Preparation

The copolymer of Part C, in amount to provide 1.6 moles of amine, is added to a 5 liter flask. Water (2.5 l) is added and the mixture is heated to ~99° C. Then 430 g of the chromophore of Example I and 32 g of cuprous chloride are added. Sodium hydroxide, 170 ml of 50% solution, is gradually added. After 60 minutes the reaction is stopped. The solution is thereafter filtered and ultrafiltered to yield a polymeric dye product similar to that obtained in Example I.

What is claimed is:

1. A copolymer comprising a plurality of ethylsulfonate and 2 to 6 carbon atom lower alkylamine groups, the sum of the number of ethylsulfonate groups and lower alkylamine groups being from 20 to 8000 and the number of lower alkylamine groups being from 0.4 to 2.5 times the number of ethylsulfonate groups.

2. The copolymer of claim 1 wherein said copolymer is represented by the structural formula:

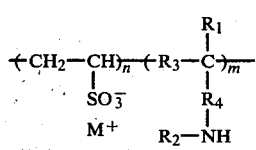

wherein $R_1$ and $R_2$ are independently selected from the group consisting of hydrogen and 1 to 4 carbon saturated alkyls, $R_3$ is a 1 to 4 carbon saturated alkyl, $R_4$ is selected from the group of carbon-nitrogen single bond and 1 to 4 carbon lower saturated alkyls and $R_1$, $R_2$, $R_3$, and $R_4$ together contain not more than 5 carbon atoms; n and m are integers, n+m is equal to 20 to 8000, n is from 0.4 to 2.5 n and $M^+$ is an alkali metal cation.

3. The copolymer of claim 1 wherein the lower alkyl amine is ethylamine, the sum of units of ethylamine and ethylsulfonate is from 20 to 8000 and the number of units of ethyl sulfonate is from 0.6 to 1.5 times the number of units of ethylamine.

4. The copolymer of claim 3 wherein the alkali metal is sodium.

5. A polymeric colorant comprising the copolymer of claim 3 having units of chromophoric group covalently bonded to from 30% to 70% of the units of ethylamine.

6. The polymeric colorant of claim 5 wherein said chromophoric group is selected from the anthraquinone and azo chromophoric groups.

7. The copolymer of claim 1 wherein the lower alkylamine is 3-methylpiperidine and the sum of units of 3-methylpiperidine and ethyl sulfonate is from 20 to 8000 and the number of units of ethyl sulfonate is from 0.6 to 1.5 times the number of units of 3-methylpiperidine.

8. A polymeric colorant comprising a copolymer having a plurality of ethylsulfonate and 2 to 6 carbon atom lower alkylamine groups, the sum of the number of ethylsulfonate groups and lower alkylamine groups being from 20 to 8000 and the number of lower alkylamine groups being from 0.4 to 2.5 times the number of ethylsulfonate groups having a plurality of chromophoric group units covalently bonded thereto through said lower alkylamine groups.

9. The polymeric colorant of claim 8 wherein said chromophoric groups is selected from the anthraquinone and azo chromophoric groups.

10. A polymeric colorant comprising a copolymer having a plurality of repeating units of ethylsulfonate and ethylamine the sum of the number of units of ethylsulfonate and ethylamine being from 20 to 8000 and the number of ethylamine units being from 0.5 to 2.5 times the number of ethylsulfonate units and having units of chromophoric group covalently bonded to from 30% to 70% of the units of ethylamine; said chromophoric group having the structure

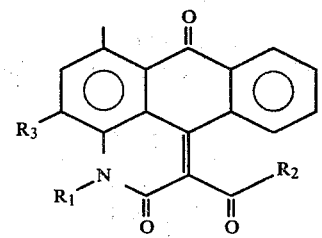

wherein $R_1$ is selected from the group consisting of hydrogen, a saturated alkyl of from 1 to 4 carbon atoms inclusive, and about 6 carbon aryls; $R_2$ is selected from the group consisting of 1 to 4 carbon inclusive saturated alkyls, 1 to 4 carbon inclusive alkoxies and about 6 carbon aryls; and $R_3$ is selected from the group consisting of hydrogen and 1 to 4 carbon saturated alkyls.

11. The polymeric colorant of claim 10 wherein $R_1$ is hydrogen, $R_2$ is methyl and $R_3$ is methyl.

12. The polymeric colorant of claim 10 wherein $R_1$ is hydrogen, $R_2$ is ethoxy and $R_3$ is methyl.

* * * * *